(12) United States Patent
Tan et al.

(10) Patent No.: US 12,549,807 B2
(45) Date of Patent: Feb. 10, 2026

(54) VIDEO PROCESSING METHOD AND APPARATUS, DEVICE AND STORAGE MEDIUM

(71) Applicant: Beijing Zitiao Network Technology Co., Ltd., Beijing (CN)

(72) Inventors: Weilin Tan, Beijing (CN); Xinghua Zhang, Beijing (CN); Lifeng Zeng, Beijing (CN); Jihao Huang, Beijing (CN); Jie Chi, Beijing (CN); Shaoxiong Chengu, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/574,263

(22) PCT Filed: Feb. 21, 2023

(86) PCT No.: PCT/CN2023/077309
§ 371 (c)(1),
(2) Date: Dec. 26, 2023

(87) PCT Pub. No.: WO2023/160515
PCT Pub. Date: Aug. 31, 2023

(65) Prior Publication Data
US 2024/0244290 A1    Jul. 18, 2024

(30) Foreign Application Priority Data
Feb. 25, 2022    (CN) .......................... 202210178794.5

(51) Int. Cl.
*H04N 21/44* (2011.01)
*G10L 15/26* (2006.01)
(Continued)

(52) U.S. Cl.
CPC ....... *H04N 21/44016* (2013.01); *G10L 15/26* (2013.01); *H04N 21/4394* (2013.01); *H04N 21/44008* (2013.01); *H04N 21/4668* (2013.01)

(58) Field of Classification Search
CPC ......... H04N 21/44016; H04N 21/4394; H04N 21/44008; H04N 21/4668; H04N 21/233;
(Continued)

(56) References Cited

U.S. PATENT DOCUMENTS 9,270,964 B1    2/2016  Tseytlin
2012/0281969 A1*  11/2012  Jiang ..................... G11B 27/00
(Continued)

FOREIGN PATENT DOCUMENTS

CN    108521578 A    9/2018
CN    110381371 A    10/2019
(Continued)

OTHER PUBLICATIONS

Office action received from Japanese patent application No. 2024-550229 mailed on Sep. 2, 2025, 10 pages (5 pages English Translation and 5 pages Original Copy).
(Continued)

*Primary Examiner* — Anthony Bantamoi

(57) ABSTRACT

Embodiments of the present disclosure relate to a video processing method and apparatus, a device and a medium. The method comprises: extracting a video content feature based on an analysis of an original video; obtaining at least one recommended material that matches the video content feature; and generating a target video by processing the original video according to the at least one recommended material, wherein the target video is a video generated by adding the at least one recommended material to the original video.

20 Claims, 11 Drawing Sheets

(51) Int. Cl.
*H04N 21/439* (2011.01)
*H04N 21/466* (2011.01)

(58) Field of Classification Search
CPC .... H04N 21/234; H04N 21/439; H04N 21/44; G10L 15/26; G10L 25/57
See application file for complete search history.

(56) References Cited

U.S. PATENT DOCUMENTS

| | | |
|---|---|---|
| 2015/0036849 A1 | 2/2015 | Thompson |
| 2015/0169542 A1* | 6/2015 | Lin .................... G06F 17/2785 |
| 2015/0169747 A1 | 6/2015 | Hume et al. |
| 2020/0258517 A1 | 8/2020 | Park |
| 2021/0329176 A1 | 10/2021 | Lin et al. |
| 2022/0358966 A1* | 11/2022 | Wang .................. G11B 27/036 |

FOREIGN PATENT DOCUMENTS

| | | | |
|---|---|---|---|
| CN | 110704682 A | 1/2020 | |
| CN | 111541936 A | 8/2020 | |
| CN | 111556335 A | 8/2020 | |
| CN | 112672209 A | 4/2021 | |
| CN | 113518256 A | 10/2021 | |
| JP | 2006099195 A * | 4/2006 | ............. H04H 60/45 |
| JP | 2016-529801 A | 9/2016 | |
| WO | WO-0172040 A2 * | 9/2001 | ....... H04N 21/23424 |
| WO | 2021/196890 A1 | 10/2021 | |

OTHER PUBLICATIONS

Extended EP Search Report issued in EP Appl. 23759140.9 dated Jan. 8, 2026 (9 pages).

* cited by examiner

FIG.6

VIDEO PROCESSING METHOD AND APPARATUS, DEVICE AND STORAGE MEDIUM

CROSS-REFERENCE TO RELATED APPLICATIONS

The present disclosure is a U.S. National Stage Application under 35 U.S.C. § 371 of International Patent Application No. PCT/CN2023/077309, filed on Feb. 21, 2023, which is based on and claims priority of Chinese application for invention No. 02210178794.5, filed on Feb. 25, 2022, the disclosures of both of which are hereby incorporated into this disclosure by reference in its entirety.

TECHNICAL FIELD

This disclosure relates to the technical field of computers, in particular to a video processing method and apparatus, a device, and a medium.

BACKGROUND

In order to process effects of a captured video, such as beautify the captured video, a user typically use a video editing software to select appropriate materials and add them to the video as decorative elements. However, the process of selecting and adding the appropriate materials one by one can increase time costs and reduce processing efficiency.

At present, some relevant video editing software has introduced video templates or One-Click Beautification schemes, allowing a captured video or image to be inserted into a selected video template to obtain a beautified video with template effects through automatic editing.

SUMMARY

According to some embodiments of the present disclosure, there is provided a video processing method, comprising: extracting a video content feature based on an analysis of an original video; obtaining at least one recommended material that matches the video content feature; and generating a target video by processing the original video according to the at least one recommended material, wherein the target video is a video generated by adding the at least one recommended material to the original video.

According to other embodiments of the present disclosure, there is provided a video processing apparatus, comprising: an extraction module configured to extract a video content feature based on an analysis of an original video; an obtaining module configured to obtain at least one recommended material that matches the video content feature; and a processing module configured to generate a target video by processing the original video according to the at least one recommended material, wherein the target video is a video generated by adding the at least one recommended material to the original video.

According to still other embodiments of the present disclosure, there is provided an electronic device, comprising: a processor; a memory for storing processor executable instructions, wherein the processor is configured to read the executable instructions from the memory and execute the executable instructions to implement the video processing method provided in the embodiments of the present disclosure.

According to still further embodiments of the present disclosure, there is provided a non-transitory computer-readable storage medium stored thereon a computer program, which when executed by a processor, causes the processor to perform the video processing method provided in the embodiments of the present disclosure.

BRIEF DESCRIPTION OF THE DRAWINGS

The above and other features, advantages, and aspects of the embodiments of the present disclosure will become more apparent from the following embodiments with reference to the drawings. Throughout the drawings, the same or similar reference signs indicate the same or similar elements. It should be understood that the drawings are schematic and the components and elements are not necessarily drawn to scale.

FIG. 6 is a schematic diagram of a further scenario for video processing provided in some embodiments of the present disclosure;

DETAILED DESCRIPTION

Figure 1:
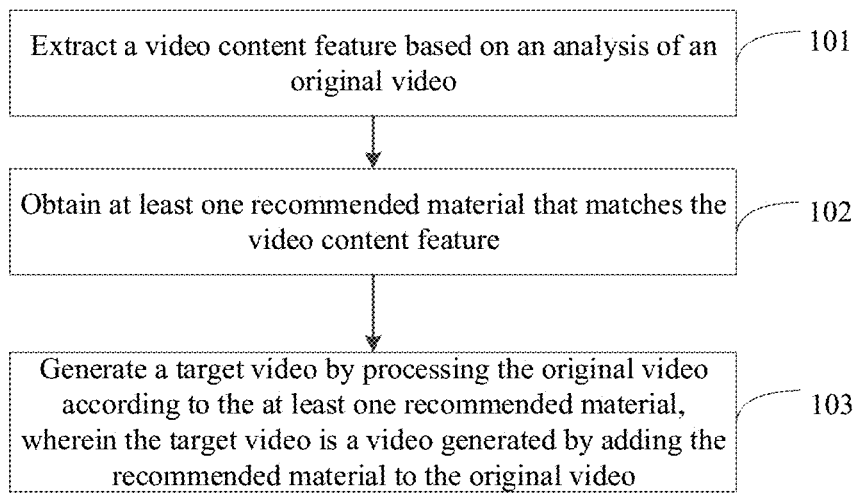
FIG. 1 is a flowchart of a video processing method provided in some embodiments of the present disclosure.

Exemplary embodiments of the present disclosure will now be described in detail with reference to the accompanying drawings. Although some embodiments of the present disclosure are shown, it should be understood that the present disclosure can be implemented in various forms, and should not be construed as being limited to the embodiments set forth herein. On the contrary, these embodiments are provided for a more thorough and complete understanding of the present disclosure. It should be understood that the drawings and embodiments of the present disclosure are only used for exemplary purposes, and are not used to limit the scope of protection of the present disclosure.

It should be understood that the various steps described in the methods of the embodiments of the present disclosure may be executed in a different order, and/or executed in parallel. In addition, the methods may comprise additional steps and/or some of the illustrated steps may be omitted. The scope of this disclosure is not limited in this regard.

The term "comprising" and its variants as used herein is an open-ended mode expression, that is, "comprising but not limited to". The term "based on" means "based at least in part on". The term "one embodiment" means "at least one embodiment"; the term "another embodiment" means "at least one additional embodiment"; The term "some embodiments" means "at least some embodiments". Related definitions of other terms will be given in the following description. It should be noted that the concepts of "first" and "second" mentioned in the present disclosure are only used to distinguish different devices, modules or units, and are not used to limit the order of functions performed by these devices, modules or units, or interdependence therebetween. It should be noted that the modifications of "a" and "a plurality of" mentioned in the present disclosure are illustrative and not restrictive, and those skilled in the art should understand that unless clearly indicated in the context, they should be understood as "one or more". The names of messages or information exchanged between multiple devices in the embodiments of the present disclosure are only used for illustrative purposes, and are not used to limit the scope of these messages or information.

The inventors have found that because the video templates created in advance are fixed, sometimes a template determined by a user through a time-consuming selection process may not be intelligently adapted to an original video imported by the user, i.e., the template cannot be directly applied. In addition, the number of effects provided by video templates is limited, and it is common for multiple videos to use a same video template, making it difficult to perform an effect processing, such as an adaptive beautification, based on specific video content of a video.

In order to solve the problem of low matching between an effect of a beautification processing and a video content in the beautification processing of a video in existing technologies, the embodiments of the present disclosure provide a video processing method. In this method, materials related to an effect processing are recommended based on a content of a video, so that the video processed based on the recommended materials has a high matching degree between a processing effect and its video content. The processing effect of each video with different content varies significantly, a "Never Repeated" processing effect can be achieved to meet a demand for personalized video processing effects.

The method will be described below in conjunction with a specific embodiment.

FIG. 1 is a schematic flowchart of a video processing method provided in some embodiments of the present disclosure. The method can be executed by a video processing apparatus, wherein the apparatus can be implemented by software and/or hardware, and can generally be integrated in an electronic device. As shown in FIG. 1, the method comprises: steps 102~106.

In step 101, a video content feature is extracted based on an analysis of an original video.

In some embodiments, to adapt to personalized characteristics of a video content for an effect processing of the original video, the video content feature is extracted based on the analysis of the original video. The original video is a video uploaded for effect processing, and the video content feature comprises, but is not limited to, one or more of an audio feature, a text feature, an image feature, a filter feature, and a feature of a capture object contained in the video.

In step 102, at least one recommended material that matches the video content feature is obtained.

In some embodiments, at least one recommended material that matches the video content feature is obtained. The at least one recommended material comprises but is not limited to one or more of an audio material, a sticker material, an animation material, a filter material, etc. In practical applications, the method of obtaining the at least one recommended material that matches the video content feature may vary depending on application scenarios. The method may be illustrated by examples in the following embodiments and will not be repeated here.

In step 103, a target video is generated by processing the original video according to the at least one recommended material, wherein the target video is a video generated by adding the recommended material to the original video.

In some embodiments, the original video is processed based on the at least one recommended material to generate the target video, that is, the at least one recommended material is added to the original video to generate the target video. In an actual execution procedure, each of the at least one recommended material has a corresponding track, so the each of the at least one recommended material can be added based on its corresponding track. For example, as shown in Table 1 below, the track of the each of the at least one recommended material is defined by its corresponding field name, type, and descriptive information. Table 1 is an example of a track of a material.

TABLE 1

| Field | Type | Required | Description |
| --- | --- | --- | --- |
| type | string | Yes | a material type, e.g., video, audio, text |
| keyword | string | Yes | a keyword(s) recommended by One-Click Beautification |
| resourceId | string | Yes | a source ID of the material |
| beginTime | int | Yes | a start time (ms) of the track |
| duration | int | Yes | a duration (ms) of the track |
| params | object | No | detailed parameters the type the material, for example:<br>text_template -> textTemplateParam<br>sticker -> stickerParam<br>audio -> audioParam |

In addition, each of the at least one recommended material also comprises corresponding parameters to further facilitate a personalized adjustment to a display effect when adding the material, for example, adjusting a size of the material after determining a material region in subsequent embodiments. For example, parameters of the text_template material shown in Table 2 can comprise scaling factor, rotation angle, and so on.

TABLE 2

| Field | Type | Required | description |
|---|---|---|---|
| text | string | Yes | content populated in the text template |
| x | float | Yes | picture location [−1, 1] |
| y | float | Yes | picture location [−1, 1] |
| scaleX | float | No | scaling factor |
| scaleY | float | No | scaling factor |
| rotation | int | No | rotation angle |

In an actual process of adding materials, different adding methods can be executed according to different material types. Different adding methods can be distinguished in terms of adding time, adding location, and adding frequency to better match the recommended material and the video content, showing a strong correlation between the recommended material and the displayed video content. The specific adding method will be illustrated in the following embodiments, which will not be repeated herein.

In summary, the video processing method provided by the embodiments of the present disclosure extracts the video content feature of the original video, obtains the at least one recommended material that matches the video content feature, and then adds the at least one recommended material to the original video to obtain the target video. Therefore, by adding the recommended material that adapt to the video content of the original video, a degree of matching between the video content and the recommended material can be improved, thereby achieving personalized processing of the video. In addition, there is no need for a user to spend time selecting a video template, the recommended material is automatically obtained and added to the original video which improves a processing efficiency of the video.

As mentioned above, in an actual execution procedure, different video content features are present in different application scenarios, as shown in the following examples.

In some embodiments of the present disclosure, in order to enhance an atmosphere of the original video, text content is extracted based on the original video.

Figure 2:
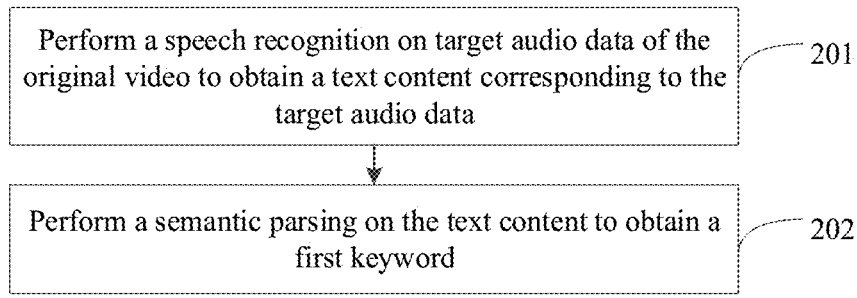
FIG. 2 is a flowchart of another video processing method provided in some embodiments of the present disclosure.

In the present embodiment, as shown in FIG. 2, extracting a video content feature based on analysis of an original video comprises steps 201~202.

In step 201, a speech recognition is performed on target audio data of the original video to obtain a text content corresponding to the target audio data.

The target audio data of the original video is obtained. In some embodiments, a preset video editing application can recognize not only a video track of the original video, but also various audio tracks contained in the original video, where each of the various audio tracks corresponds to a sound source. For example, for original video A containing voices of users a and b, an audio track corresponding to the voice of user a and an audio track corresponding to the voice of user b can be identified.

In some embodiments, in order to facilitate the processing of each audio track, all audio tracks displayed in a video editing application for a video file of the original video are obtained. It is readily appreciated that an audio source corresponding to each of the audio tracks has an occurrence time, and therefore, in some embodiments, the each of the audio tracks is also displayed based on a timeline.

Figure 3:
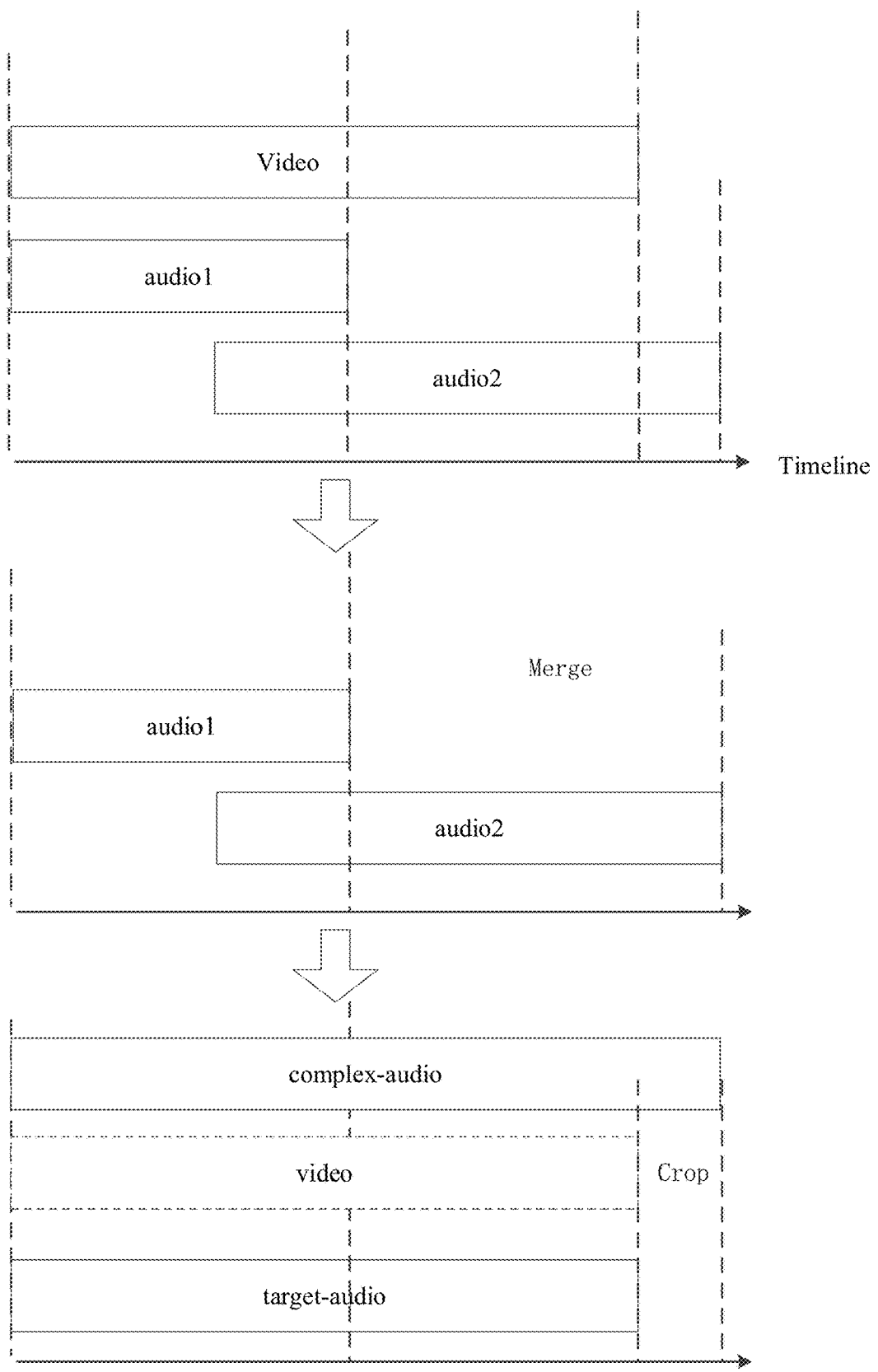
FIG. 3 is a schematic diagram of a scenario for video processing provided in some embodiments of the present disclosure.

For example, as shown in FIG. 3, if the video file of the original video is split into one video track "video" and two audio tracks "audio1" and "audio2", the audio tracks can be displayed in the video editing application.

In some embodiments, referring to FIG. 3, all audio tracks are merged based on the timeline to generate total audio data. For example, audio1 and audio2 are merged based on the timeline to generate total audio data "complex audio", which comprises all audio data in the original video.

Of course, as mentioned above, the total audio data is also time-dependent. Therefore, if a first duration of the total audio data is longer than a second duration of a second video of the original video, in order to ensure consistency in a project length and to avoid audio data without corresponding video content, the first duration of the total audio data is cropped to obtain the target audio data, where the duration of the target audio data is consistent with the second duration.

For example, referring to FIG. 3, if a duration of "complex-audio" is longer than a duration of "video", a portion of the "complex audio" on the timeline that is longer than the duration of "video" is cropped to obtain "target-audio", so that "target audio" is aligned with "video" on the timeline for subsequent video processing.

Of course, in an actual execution procedure, the audio file corresponding to the original video may not only comprise audio data of an interaction between capture objects, but also comprise a background sound, such as a sound of music playing in an environment or a sound of vehicles passing on a road in an environment. The background sound is usually independent of the video content. Therefore, in order to improve an accuracy of a subsequent extraction of the video content feature and to avoid the background sound interfering with the extraction of the video content feature (e.g., a text content in the background sound may also be recognized when extracting a video text feature), in some embodiments, the background sound in the original video can be removed.

In some embodiments, an audio identifier is detected for each of the audio tracks. For example, based on an identification of a sound feature such as a sound spectrum of an audio corresponding to the each of the audio tracks, the sound feature of the audio corresponding to the each of the audio tracks can be matched with a preset sound feature corresponding to each audio identifier. Based on a matching result, an audio identifier is determined for the each of the audio tracks. If a target audio track with an identifier representing background music is detected, all audio tracks except that target audio track are merged to generate the total audio data based on the timeline.

Figure 4:
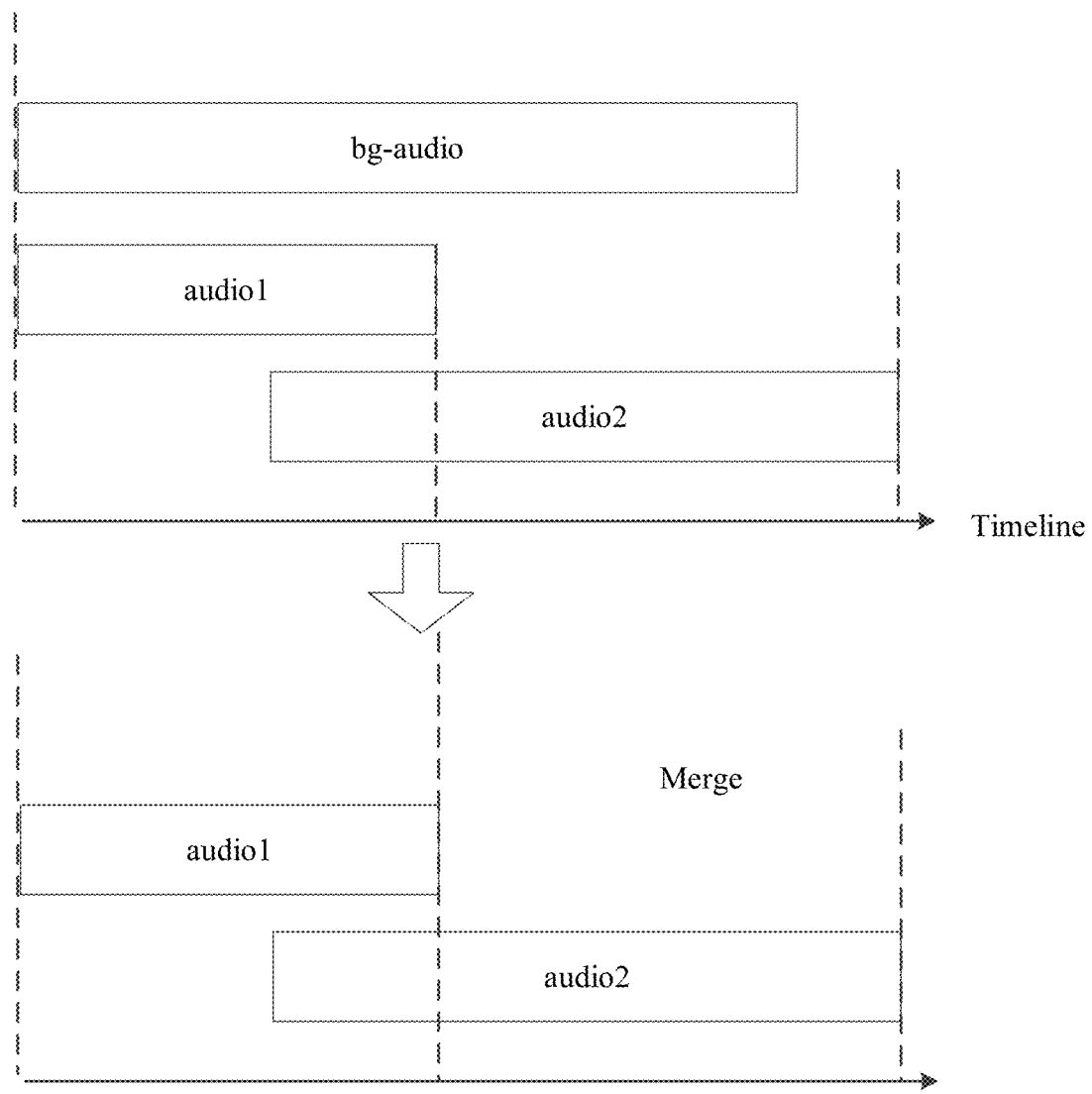
FIG. 4 is a schematic diagram of another scenario for video processing provided in some embodiments of the present disclosure.

For example, as shown in FIG. 4, with the scenario shown in FIG. 3 as an example, if the audio identifiers of the audio tracks recognized from the original video are "audio1", "audio2", and "bg-audio", due to the matching of "bg-audio" with the background music identifier, only the audio tracks corresponding to "audio1" and "audio2" are merged when generating the total audio data.

Of course, in an actual execution procedure, the target audio data can also be obtained by merging all audio tracks corresponding to the original video, or simply by merging audio tracks that match a preset type of sound feature, which can be set according to the needs of the specific scenario and is not limited here.

In some embodiments, after obtaining the original video, speech recognition processing is performed on the target audio data of the original video to obtain corresponding text content. The acquisition of this text content can be achieved by recognition using speech recognition technology.

In step 202, a semantic parsing is performed on the text content to obtain a first keyword.

The first keyword can be used in a content sense to match a recommended material for the original video. For example, the first keyword can be an emotional keyword such as "Haha, so funny". Therefore, based on the first keyword, a render emotional material can be recommended for the original video, such as some laugh sticker materials or some fireworks animation materials. For example, if the first keyword is a vocabulary from a professional field such as "basin", then based on the first keyword, a professional sticker material from a corresponding field can be recommended and introduced for the original video, making the vocabulary in the corresponding professional field more accessible and understandable.

In some embodiments, the semantic parsing is performed on the text content, and a parsed semantic result is matched against semantics of some preset keywords to determine the first keyword which is successfully match.

Figure 5:
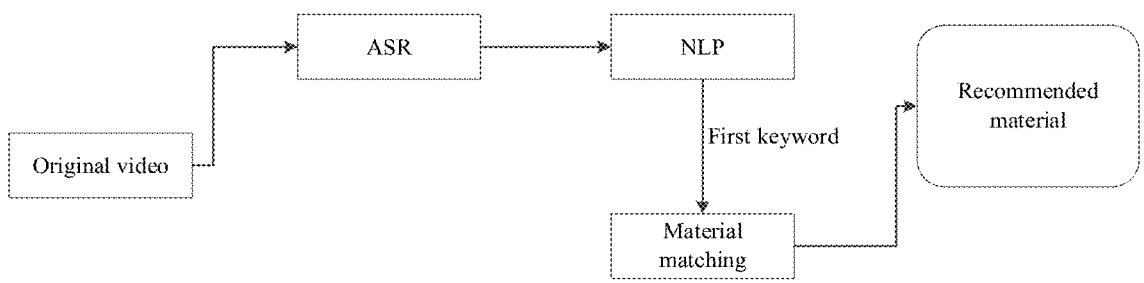
FIG. 5 is a schematic diagram of still another scenario for video processing provided in some embodiments of the present disclosure.

In some embodiments, to improve a recognition efficiency and accuracy of the first keyword, as shown in FIG. 5, text statements can be obtained by recognizing the text content of the target audio data using automatic speech recognition (ASR) technology, and then semantics of the text statements can be understood using natural language processing (NLP) technology to obtain the first keyword.

In some embodiments, the material recommended based on the first keyword can ensure a correlation between the recommended material and the video content in a content sense to better render the video content. For example, as shown in FIG. 6 (in order for technical personnel in the art to have a more intuitive understanding of the solution, the first keyword is displayed in a form of subtitles), after a semantic analysis of text content of the original video, the first keyword "Haha" is obtained, and the recommended material is an "applause" sticker material. Thus, in the processed video, the "applause" sticker is displayed for the audio of "Haha", which further creates a happy atmosphere, and the added recommendation material is more consistent with the video content, making the addition of recommendation material seem less abrupt.

Figure 7:
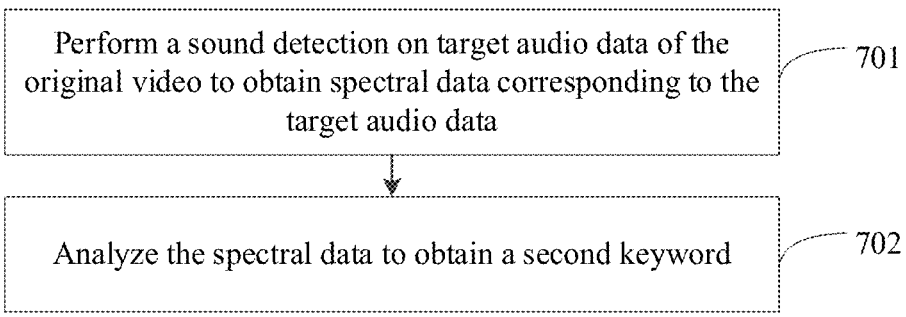
FIG. 7 is a flowchart of another video processing method provided in some embodiments of the present disclosure.

In some embodiments of the present disclosure, as shown in FIG. 7, the extracting the video content feature based on the analysis of the original video comprises the following steps.

In step 701, a sound detection is performed on the target audio data of the original video to obtain spectral data corresponding to the target audio data.

In some embodiments, it is considered that in some scenarios, even if the target audio data cannot be converted into corresponding text content, it may still reflect a content feature of the original video. For example, if the target audio data comprises "applause" or "explosion" sound, adding a recommendation material based on the target audio data may further enhance an atmosphere of the original video in conjunction with an audio corresponding to the target audio data.

Therefore, in some embodiments, the target audio data mentioned in the above embodiment is subjected to the sound detection to extract the spectral data corresponding to the target audio data. It is obvious that some information that cannot be converted into the text content but can reflect the video content feature of the original video can be extracted from the spectral data.

In step 702, the spectral data is analyzed to obtain a second keyword.

In some embodiments, the spectral data is analyzed to obtain a second keyword, wherein the at least one recommended material corresponding to the spectral data can be obtained based on the second keyword.

In some possible embodiments, the spectral data can be inputted to a deep learning model trained based on a large amount of sample data to obtain the second keyword outputted from the deep learning model.

In other embodiments, the spectral data can be matched with preset spectral data of each keyword, and the second keyword corresponding to the spectral data can be determined based on a degree of match. For example, if the degree of match between the spectral data obtained and spectral data corresponding to a keyword "explosion" is greater than a preset threshold, then the second keyword corresponding to the target audio data is determined to be "explosion".

Figure 8:
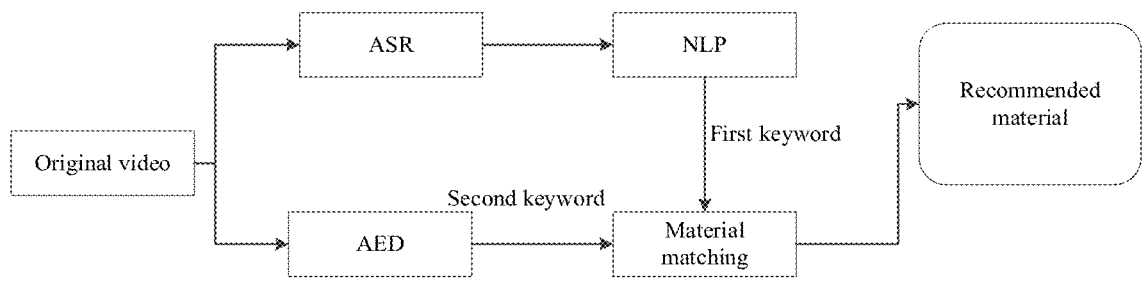
FIG. 8 is a schematic diagram of a further scenario for video processing provided in some embodiments of the present disclosure.

Referring to FIG. 8, the first and second keywords may also be combined for determining the at least one recommended material. The second keyword may be a keyword identified based on an audio event detection (AED) technology. The at least one recommended material may then be determined based on the first keyword and the second keyword.

Figure 9:
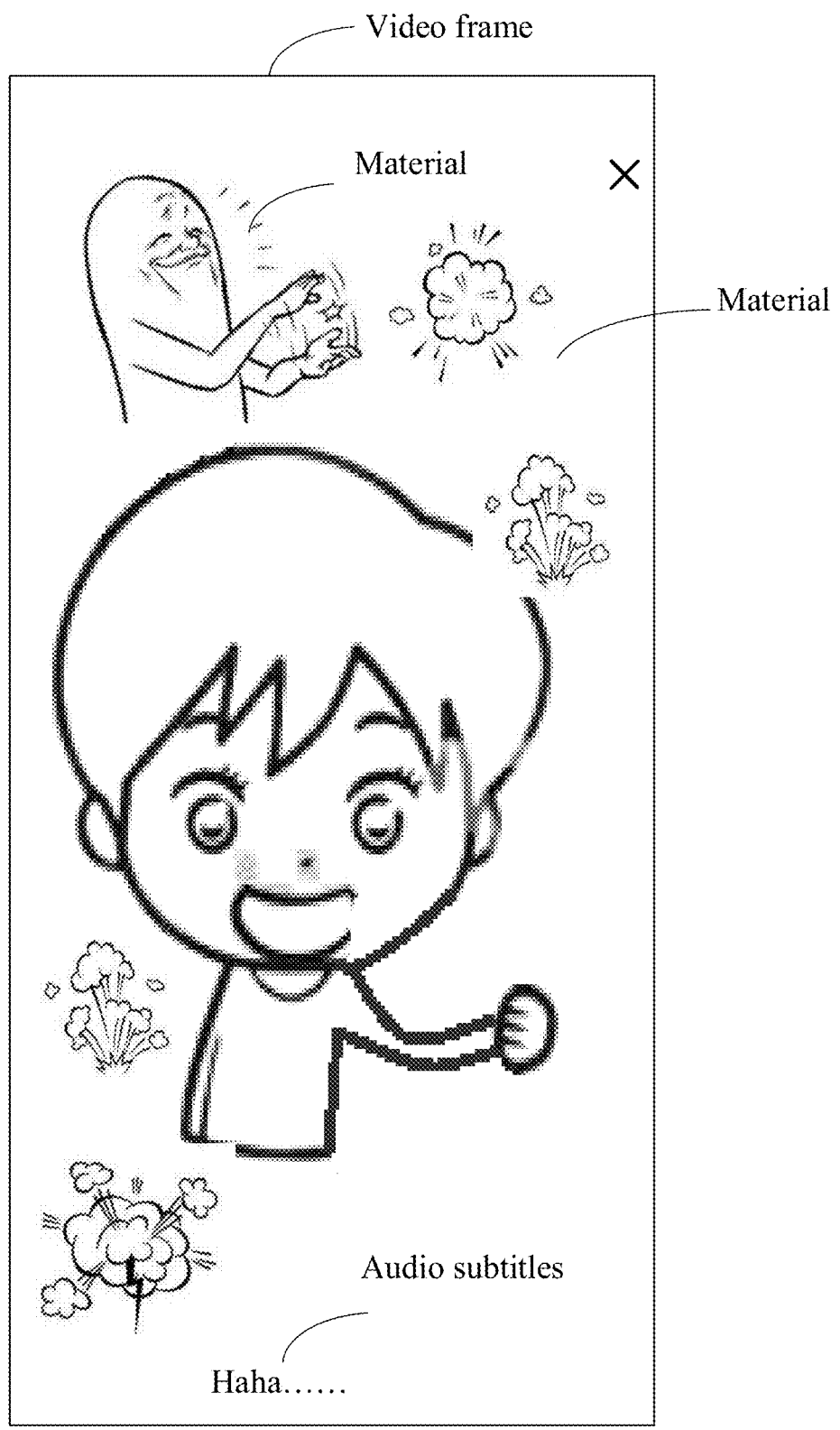
FIG. 9 is a schematic diagram of a further scenario for video processing provided in some embodiments of the present disclosure.

For example, as shown in FIG. 9, after obtaining the spectral data by performing the sound detection on the target audio data of the original video, if the second keyword obtained from the spectral data is "explosion", then the at least one recommended material matched is an "explosion" sticker. Therefore, the "explosion" sticker is displayed on a corresponding video frame to further render a video content containing an explosion sound.

In summary, in the video processing method of the present disclosure, any feature reflecting the video content can be used as the video content feature. The extracted video content feature has a strong correlation with the video content, thereby ensuring the correlation between the recommended material recommended based on the video content feature and the video content, and providing technical support for the personalized processing effect of the video.

Based on the above embodiments, after obtaining the video content feature, the recommended material matching the video content feature is then recommended, and a processing effect of the original video is determined by the recommended material. The determination of the recommended material will be described with a specific example.

Figure 10:
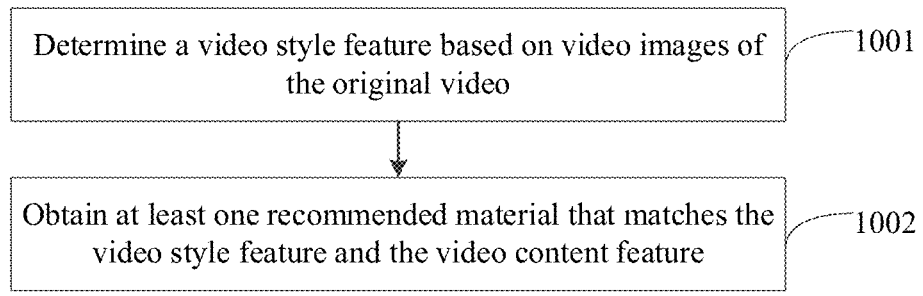
FIG. 10 is a flowchart of another video processing method provided in some embodiments of the present disclosure.

In some embodiments of the present disclosure, as shown in FIG. 10, the obtaining the at least one recommended material that matches the video content feature comprises steps 1001~1002.

In step 1001, a video style feature is determined based on video images of the original video.

It is easy to understand that videos having a same video content feature may correspond to different video styles. Therefore, if a same recommended material is added to the videos, a degree of matching between the video content and the recommended material can be affected. For example, in a case where a first keyword obtained based on the target audio data of the original video S1 through a semantic analysis is "Haha", which is voiced by an anime character in S1, and a first keyword obtained based on the target audio data of the original video S2 through a semantic analysis is also "Haha", which is voiced by a real character in S2, it is obvious that recommending a same material to adapt to these two styles may affect the processing effect of the original videos.

In the embodiments of the present disclosure, in order to ensure the processing effect of the video, the video style feature is determined based on the video images of the original video. The video style feature may comprise an image feature of the video content, a thematic style feature of the video content, and a feature of a capture object comprised in the original video etc., which is not limited herein.

It should be noted that, in different application scenarios, methods of determining the video style feature based on the video images of the original image are different, some examples of which will be given below.

Figure 11:
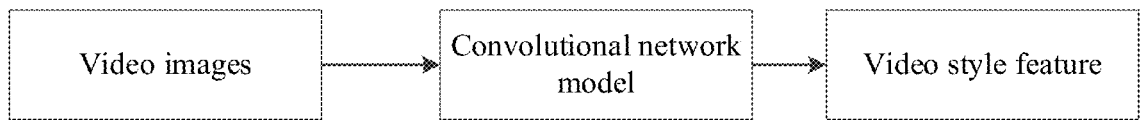
FIG. 11 is a schematic diagram of a further scenario for video processing provided in some embodiments of the present disclosure.

In some embodiments, as shown in FIG. 11, a convolutional network model is pre-trained based on a large amount of sample data, and the video images are input into the convolutional network model to obtain the video style feature outputted by the convolutional network model.

Figure 12:
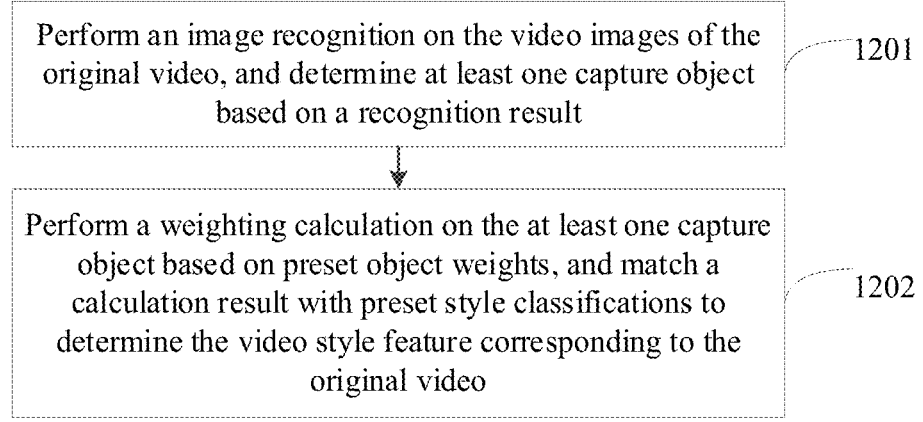
FIG. 12 is a flowchart of another video processing method provided in some embodiments of the present disclosure.

In some embodiments, as shown in FIG. 12, the determining the video style feature based on the video images of the original video comprises steps 1201~1202.

In step 1201, an image recognition is performed on the video images of the original video to determine at least one capture object based on a recognition result.

The capture object can be any subject comprised in the video images, comprising but not limited to: a people, an animal, a furniture, a tableware, etc.

In step 1202, a weighting calculation is performed on the at least one capture object based on preset object weights and a calculation result is matched with preset style classifications to determine the video style feature corresponding to the original video.

In some embodiments, in order to determine a video style, an object type can be identified for each of the at least one capture object, and a preset database can be queried to obtain an object weight for the each of the at least one capture object. The database contains an object weight corresponding to each of various capture object types that are obtained by training based on a large amount of sample data. Then, the weighting calculation is performed on the at least one capture object based on the preset object weights, and the calculation result is matched with preset style classifications to determine the video style feature which is a successfully matched style classification.

Figure 13:
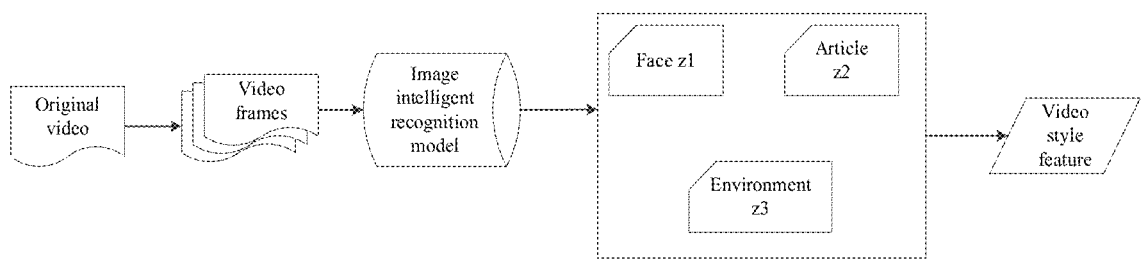
FIG. 13 is a schematic diagram of a further scenario for video processing provided in some embodiments of the present disclosure.

As shown in FIG. 13, a plurality of image frames can be extracted from the original video, and are used as the video images of the original video to further improve the efficiency of style recognition. In some embodiments, a plurality of image frames can be extracted from the original video based on a preset time interval (such as 1 second), or video segments can be extracted at intervals according to a preset time length, and a plurality of image frames contained in these video segments can be used as the video images of the original video.

In some embodiments, after obtaining the video images, the video images can be inputted into a pre-trained intelligent image recognition model to determine the at least one capture object based on the recognition result. The at least one capture object in the video images may comprise a face, an object, and/or and environment, etc. For example, classification features t1, t2, t3 corresponding to the capture objects can be identified, which have corresponding object weights of z1, z2, and z3, respectively. Then, a value of t1z1+t2z2+t3z3 is calculated as the calculation result. The calculation result is matched with the preset style classifications to determine the video style feature corresponding to the original video.

In step 1002, the at least one recommended material that matches the video style feature and the video content feature is obtained.

In some embodiments, after obtaining the video style feature, the at least one recommended material matching the video style feature and the video content feature is obtained, so that the recommended material matches the video content in terms of the video style feature and the video content feature, further improving the processing effect of the original video.

Figure 14:
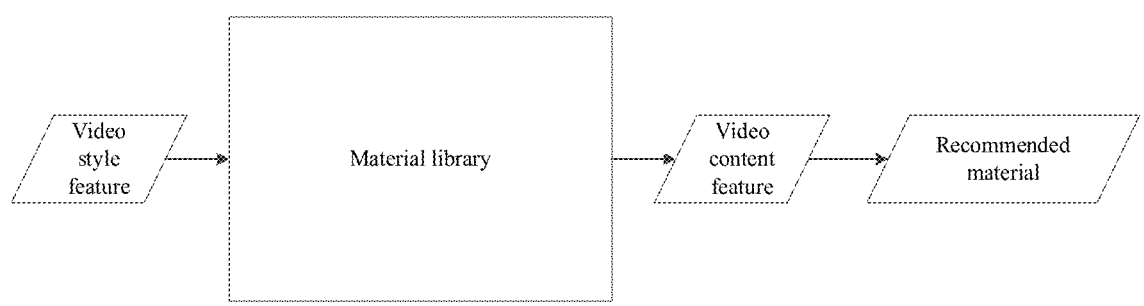
FIG. 14 is a schematic diagram of a further scenario for video processing provided in some embodiments of the present disclosure.

In some embodiments, as shown in FIG. 14, it is possible to first obtain a material library that matches the video style feature, and then the at least one recommended material that matches the video content feature can be obtained from the material library, thereby ensuring that the at least one recommended material not only matches the video content, but is also consistent with the video style.

For example, if the video style feature is "girl anime", a material library composed of various materials of a girl style that match the "girl anime" is obtained. Then, based on the video content feature, at least one recommended material in the material library composed of various materials of the girl style is matched to ensure that the at least one recommended material obtained belongs to the girl style.

Figure 15:
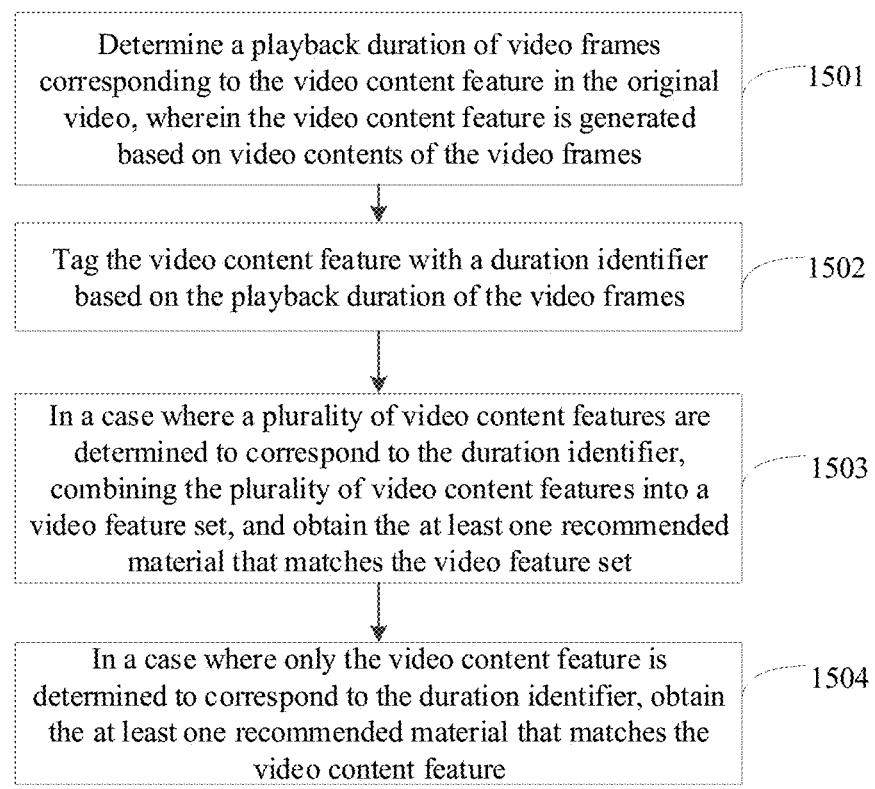
FIG. 15 is a flowchart of another video processing method provided in some embodiments of the present disclosure.

In some embodiments of the present disclosure, as shown in FIG. 15, obtaining the at least one recommended material that matches the video content feature comprises steps 1501~1504.

In step 1501, a playback duration of video frames corresponding to the video content feature in the original video is obtained, wherein the video content feature is generated based on a video content of the video frames;

In some embodiments, not every video image contains the same video content feature, and the video content feature is generated based on the video content of the video frames. Therefore, the playback duration of video frames corresponding to the video content feature is determined in the original video to recommend and add the recommended material based on the playback duration only for the video frames containing the video content feature.

In step 1502, the video content feature is tagged with a duration identifier based on the playback duration of the video frames.

In some embodiments, the video content feature is tagged with the duration identifier based on the playback duration of the video frames to facilitate temporal matching of the recommended material.

In step 1503, if a plurality of video content features are determined to correspond to the duration identifier, the plurality of video content features are combined into a video feature set and the at least one recommended material that matches the video feature set is obtained. The plurality of video content features comprises the video content feature.

In some embodiments, for a duration identifier, that is, for a video frame corresponding to a duration, if it is determined that there are a plurality of video content features corresponding the video frame, the plurality of video content features are combined into a video feature set, and at least one recommended material that matches the video feature set is obtained.

In some embodiments, a plurality of video content feature combinations (video feature sets) can be generated by combining a plurality of video content features. Preset correspondences can be inquired to determine whether there is an enhancement material corresponding to each of the plurality of video content feature combinations. For the each of the plurality of video content feature combinations, if there is no enhancement material corresponding to the video content feature combination, the video content feature combination is split into individual content features to match the at least one recommended material. If there is an enhancement material corresponding to the video content feature combination, the enhancement material is used as the at least one recommended material.

It should be understood that the enhancement material here does not necessarily comprise a simple combination of recommended materials corresponding to the plurality of video content features. It may also comprise, another recommended material with stronger atmosphere generated to further enhance the atmosphere of the video, in case that there is a correlation between the plurality of video content features.

For example, if a first keyword corresponding to video content feature 1 is "Haha" and a second keyword corresponding to video content feature 2 is "applause" among a plurality of video content features, then the recommended material based on a joint determination of the first keyword and the second keyword is a transition effect material, instead of sticker materials corresponding to "Haha" and "applause" mentioned above.

In step 1504, if only the video content feature is determined to correspond to the duration identifier, the at least one recommended material that matches the video content feature is obtained.

In some embodiments, if it is determined that there is only the video content feature corresponding to the duration identifier, the at least one recommended material that matches the video content feature is obtained. That is, the at least one recommended material is obtained for a single video content feature.

Further, after obtaining the at least one recommended material, when generating the target video based on the at least one recommended material, a material application duration for the at least one recommended material that matches the video content feature is set according to the duration identifier of the video content feature. The application duration is consistent with the playback duration of the video frames corresponding to the video content feature.

Furthermore, the original video is edited to generate the target video according to the material application duration of the at least one recommended material. Therefore, the at least one recommended material is only added when playing the video frames that contain the video content feature that corresponds to the at least one recommended material, to avoid inconsistency between the application of the at least one recommended material and the video content.

In addition, in an actual execution process, some materials do not have size information, such as sound materials, transition effect materials, etc., while others do have size information, such as sticker materials and text materials. To avoid some materials with size information being added in a way that obscures important display content in the video, e.g. covering a face in the video frames, etc., it is necessary to determine an application region for these materials with size information.

In some embodiments, in a case where a material type of the at least one recommended material is a preset target type (in a case where the at least one recommended material has a size information attribute, the at least one recommended material is considered to match the preset target type), target video frames corresponding to the material application duration of the at least one recommended material are obtained from the original video, and a main region of a capture object is obtained by an image recognition performed on the target video frames. The main region can be represented by any positional information reflecting a location of the capture object, such as a central coordinate point, or a positional range.

For example, if the recommended material is added based on the first keyword "Haha", the capture object is a speaker of "Haha" audio. After determining the main region of the capture object, a material region of the target video frames is determined based on the main region of the capture object to add the recommended material.

In some embodiments, it is possible to determine a material type tag for each of the at least one recommended material. A region feature (such as a background region on an image) of the material region is then determined by a query for preset correspondence based on the material type tag, and a region matching the region feature on the target video frames is determined as the material region.

In other possible embodiments, it is possible to determine an object type tag for the capture object. A region feature of the material region is then determined by a query for preset correspondence based on the object type tag (such as if the capture object is a face type, the region feature corresponds to the top of the head, etc.), and a region matching the region feature on the target video frames is determined as the material region.

After determining the material region, according to the application duration and the material region of the at least one recommended material, the original video is edited to generate the target video. The at least one recommended material is added to the material region in the video frames corresponding to the material application duration, wherein the material region may be represented by coordinates of a center point where the recommended material is added to the video frames, or a coordinate range of the recommended material added to the video frames. Since a server that performs the determination of the main region and the like may not be a same server as a server that performs the above style feature recognition. The server that performs the above style feature recognition may be a local server in order to improve the recognition efficiency. The server that performs the determination of the material application duration and the material region may be a remote server to reduce the pressure on the computing power for the analysis of the material application duration and the material region.

Figure 16:
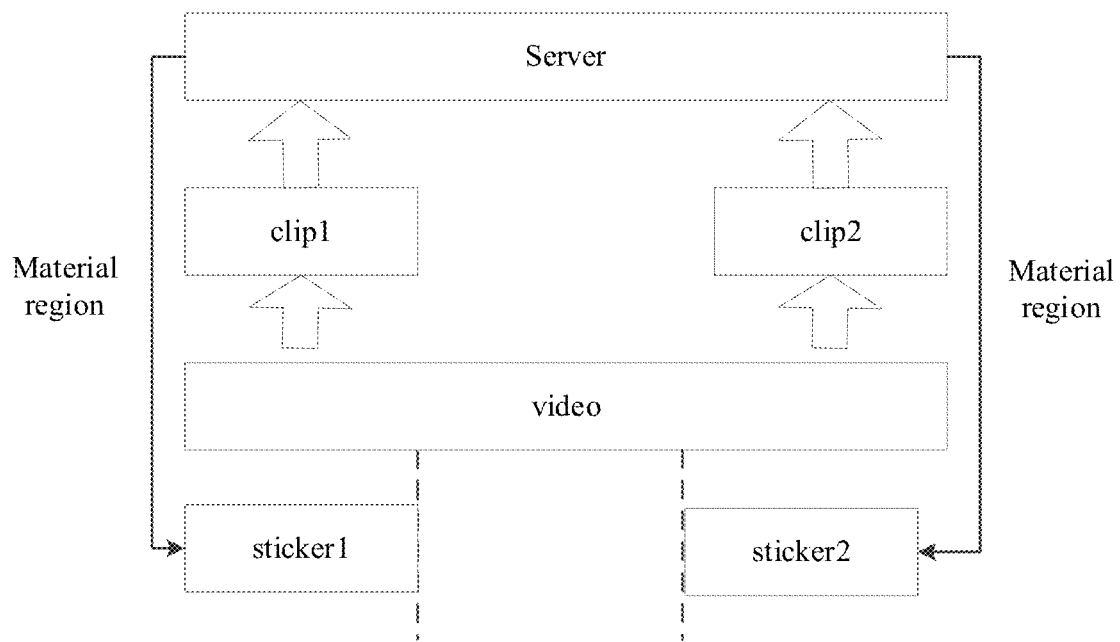
FIG. 16 is a schematic diagram of a further scenario for video processing provided in some embodiments of the present disclosure.

In some embodiments, as shown in FIG. 16, if the recommended materials comprise F1 and F2 each having a size attribute, and the material application durations that match the video content features are set to t1 and t2 based on the duration identifiers of the video content features. The original video is edited according to the material application durations of the recommended materials to obtain a video segment clip1 corresponding to F1 and a video segment clip2 corresponding to F2. After sending clip1 and clip2 to a corresponding server, the server optimizes the recommended materials, identifies the main region of the capture object by the image recognition performed on the target video frames, and then determines a material region(s) for adding the recommended materials to the target video frames based on the main region of the capture object. According to the material application durations and the material region(s) of the recommended materials, a target video segment sticker1 corresponding to clip1 and a target video segment sticker2 corresponding to clip2 are determined, and the original video is edited based on sticker1 and sticker2 to obtain the target video.

In summary, after determining the video content features, the video processing method of the present disclosure determines the at least one recommended material that matches the multi-dimensional video content features, and further ensures the correspondence between the at least one recommended material and the video frames in terms of position and time, thereby ensuring that the video processing effect can satisfy the personalized characteristics of the video content.

Figure 17:
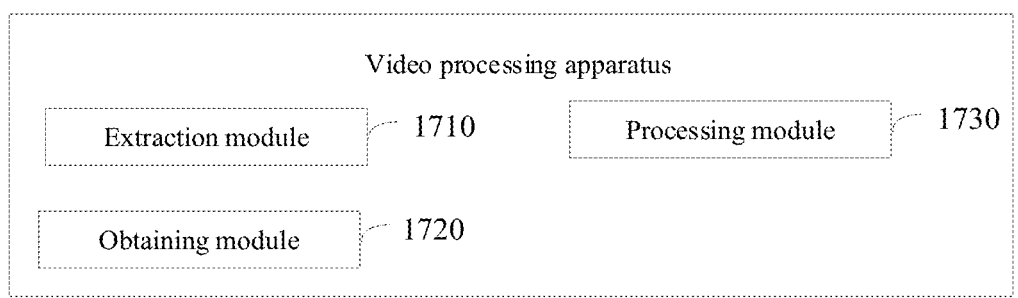
FIG. 17 is a schematic structural diagram of a video processing apparatus provided in some embodiments of the present disclosure.

In order to implement the above embodiment, the present application further provides a video processing apparatus. FIG. 17 is a schematic structural diagram of a video processing apparatus according to some embodiments of the present disclosure. The apparatus can be implemented by software and/or hardware, and can generally be integrated into an electronic device. As shown in FIG. 17, the apparatus comprises: extraction module 1710, obtaining module 1720, and processing module 1730.

The extraction module 1710 is configured to extract a video content feature based on an analysis of an original video.

The obtaining module 1720 is configured to obtain at least one recommended material that matches the video content feature.

The processing module 1730 is configured to generate a target video by processing the original video according to the at least one recommended material, wherein the target video is a video generated by adding the recommended material to the original video.

The video processing apparatus provided in some embodiments of the present disclosure can execute the video processing method provided in any embodiment of the present disclosure, and has corresponding functional modules to implement the method and achieve the beneficial effect of the present disclosure.

In order to implement the above embodiment, the present application further provides a computer program product containing a computer program/instructions that, when executed by a processor, implement the video processing method provided in the above embodiment.

Figure 18:
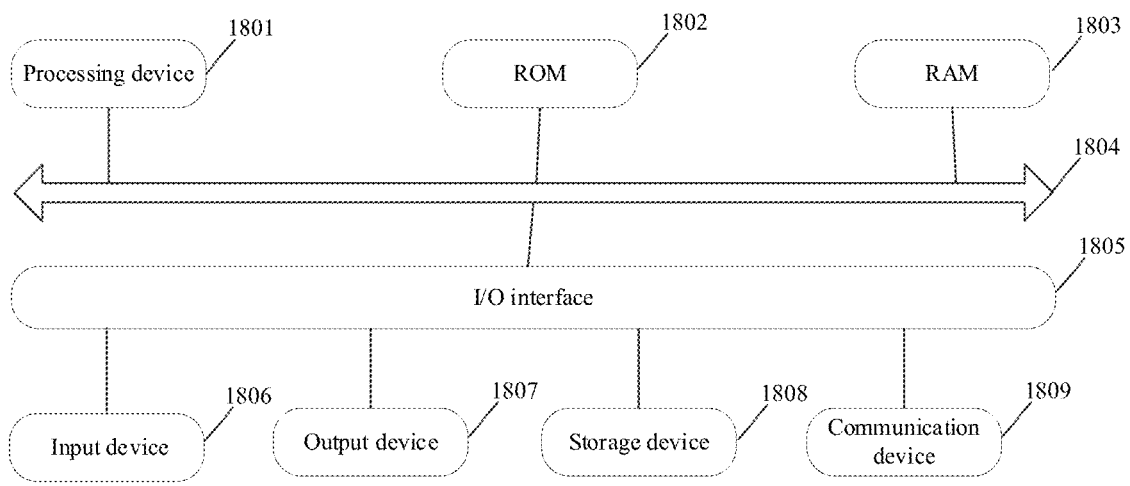
FIG. 18 is a schematic structural diagram of an electronic device provided in some embodiments of the present disclosure.

FIG. 18 is a schematic structural diagram of an electronic device provided in some embodiments of the present disclosure.

Referring to FIG. 18, a schematic structural diagram of an electronic device 1800 suitable for implementing the embodiments of the present disclosure is shown. The electronic device 1800 of the embodiment of the present disclosure may comprise, but not limited to, a mobile terminal such as a mobile phone, a notebook computer, a digital broadcast receiver, a PDA (Personal Digital Assistant), a PAD (tablet computer), a PMP (Portable Multimedia Player), an on-board terminal (such as an on-board navigation terminal), and a fixed terminal such as a digital TV, a desktop computer, and the like. The electronic device shown in FIG. 18 is merely an example and should not impose any limitation on the function and scope of the embodiment of the present disclosure.

As shown in FIG. 18, the electronic device 1800 may comprise a processing device (e.g., a central processing unit, a graphics processor) 1801, which may perform various appropriate actions and processes according to a program stored in Read Only Memory (ROM) 1802 or a program loaded from storage device 1808 into Random Access Memory (RAM) 1803. In RAM 1803, various programs and data required for the operation of the electronic device 1800 are also stored. The processing device 1801, ROM 1802, and RAM 1803 are connected to each other through a bus 1804. An input/output (I/O) interface 1805 is also connected to the bus 1804.

Generally, the following devices can be connected to the I/O interface 1805: input devices 1806 comprising, for example, a touch screen, a touch pad, a keyboard, a mouse, a camera, a microphone, an accelerometer, a gyroscope, etc.; output devices 1807 comprising a liquid crystal display (LCD), a speaker, a vibrator, etc.; a storage device 1808 such as a magnetic tape, a hard disk, etc.; and a communication device 1809. The communication device 1809 enables the electronic device 1800 to communicate wirelessly or wirelessly with other devices to exchange data. Although FIG. 18 shows the electronic device 1800 with various components, it should be understood that it is not required to implement or have all of these components. Alternatively, more or fewer components can be implemented or provided.

In particular, according to some embodiments of the present disclosure, the processes described above with reference to the flowchart can be implemented as a computer software program. For example, an embodiment of the present disclosure comprises a computer program product, which comprises a computer program carried on a non-transitory computer readable medium, and containing program code for executing the method shown in the flowchart. In such an embodiment, the computer program may be downloaded and installed from the network through the communication device 1809, or installed from the storage device 1808, or from the ROM 1802. When the computer program is executed by the processing device 1801, the above functions defined in the video processing method according to the embodiment of the present disclosure are performed.

It should be noted that the computer-readable medium in the present disclosure may be a computer-readable signal medium or a computer-readable storage medium, or any combination of thereof. The computer readable storage medium can be, for example, but not limited to, an electronic, magnetic, optical, electromagnetic, infrared, or semiconductor system, apparatus, or device, or any combination of the above. More specific examples of the computer readable storage medium may comprise, but are not limited to: electrical connection with one or more wires, portable computer disk, hard disk, random access memory (RAM), read only memory (ROM), erasable programmable read only memory (EPROM or flash), fiber optics, portable compact disk Read only memory (CD-ROM), optical storage device, magnetic storage device, or any suitable combination of the foregoing. In the present disclosure, a computer readable storage medium can be any tangible medium that can contain or store a program, which can be used by or in connection with an instruction execution system, apparatus or device. In the present disclosure, a computer readable signal medium may comprise a data signal that is propagated in the baseband or as part of a carrier, carrying computer readable program code. Such propagated data signals can take a variety of forms comprising, but not limited to, electromagnetic signals, optical signals, or any suitable combination of the foregoing. The computer readable signal medium can also be any computer readable medium other than a computer readable storage medium, which can transmit, propagate, or transport a program for use by or in connection with the instruction execution system, apparatus, or device. Program code embodied on a computer readable medium can be transmitted by any suitable medium, comprising but not limited to wire, fiber optic cable, RF (radio frequency), etc., or any suitable combination of the foregoing.

In some embodiments, a client and a server can communicate using any currently known or future developed network protocol such as HTTP (HyperText Transfer Protocol), and can be interconnected by any form or medium of digital data communication, e.g., a communication network. Examples of communication networks comprise a local area network ("LAN") and a wide area network ("WAN"), the Internet, and end-to-end networks (for example, ad hoc end-to-end networks), as well as any currently known or future developed networks.

The above computer-readable medium may be comprised in the electronic device described above; or it may exist alone without being assembled into the electronic device.

The computer-readable medium carries one or more programs that cause, when executed by the electronic device, the electronic device to: extract a video content feature of the original video, obtain at least one recommended material that matches the video content feature, and then add the recommended material to the original video to obtain the target video. Therefore, by adding video materials that adapt to the video content of the video, the degree of matching between the video content and the video materials can be improved, thereby achieving personalized processing of the video.

The computer program code for executing operations of the present disclosure may be complied by any combination of one or more program design languages, the program design languages comprising object-oriented program design languages, such as Java, Smalltalk, C++, etc., as well as conventional procedural program design languages, such as "C" program design language or similar program design language. A program code may be completely or partly executed on a user computer, or executed as an independent software package, partly executed on the user computer and partly executed on a remote computer, or completely executed on a remote computer or server. In the latter circumstance, the remote computer may be connected to the user computer through various kinds of networks, comprising local area network (LAN) or wide area network (WAN), or connected to external computer (for example using an internet service provider via Internet).

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of code, which comprises one or more executable instructions for implementing the specified function or functions. It should also be noted that, in some alternative implementations, the functions noted in the block may occur out of the order noted in the FIGS. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The units involved in the embodiments described in the present disclosure can be implemented in software or hardware. Wherein, the names of the units do not constitute a limitation on the units themselves under certain circumstances.

The functions described above may be performed at least in part by one or more hardware logic components. For example, without limitation, exemplary types of hardware logic components that can be used comprise: Field Programmable Gate Array (FPGA), Application Specific Integrated Circuit (ASIC), Application Specific Standard Product (ASSP), System on Chip (SOC), Complex Programmable Logic Device (CPLD), etc.

In the context of the present disclosure, a machine-readable medium may be a tangible medium, which may contain or store a program for use by or in connection with an instruction execution system, apparatus, or device. The machine-readable medium may be a machine-readable signal medium or a machine-readable storage medium. The machine-readable medium may comprise, but is not limited to, an electronic, magnetic, optical, electromagnetic, infrared, or semiconductor system, apparatus, or device, or any suitable combination of thereof. More specific examples of the machine-readable storage medium may comprise electrical connection with one or more wires, portable computer disk, hard disk, random access memory (RAM), read only memory (ROM), erasable programmable read only memory (EPROM or flash), fiber optics, portable compact disk Read only memory (CD-ROM), optical storage device, magnetic storage device, or any suitable combination of the foregoing.

According to some embodiments of the present disclosure, the present disclosure provides a video processing method, comprising:
  extracting a video content feature based on an analysis of an original video;
  obtaining at least one recommended material that matches the video content feature; and
  generating a target video by processing the original video according to the at least one recommended material, wherein the target video is a video generated by adding the at least one recommended material to the original video.

According to some embodiments of the present disclosure, in the video processing method provided by the present disclosure, the extracting the video content feature based on the analysis of the original video comprises:
  performing a speech recognition on target audio data of the original video to obtain a text content corresponding to the target audio data; and
  performing a semantic parsing on the text content to obtain a first keyword.

According to some embodiments of the present disclosure, in the video processing method provided by the present disclosure, the extracting the video content feature based on the analysis of the original video comprises:
  performing a sound detection on target audio data of the original video to obtain spectral data corresponding to the target audio data; and
  analyzing the spectral data to obtain a second keyword.

According to some embodiments of the present disclosure, in the video processing method provided by the present disclosure, the target audio data is obtained by:
  obtaining all audio tracks displayed in a video editing application for a video file of the original video;
  merging all the audio tracks based on a timeline to generate total audio data; and
  comparing a first duration of the total audio data with a second duration of the original video and cropping the first duration of the total audio data to obtain the target audio data in response to the first duration being greater than the second duration, wherein the duration of the target audio data is consistent with the second duration.

According to some embodiments of the present disclosure, in the video processing method provided by the present disclosure, the merging all the audio tracks based on the timeline to generate the total audio data comprises:

detecting an audio identifier of each of the audio tracks; and in response to detecting a target audio track with an identifier representing background music, merging all audio tracks except that target audio track based on the timeline to generate the total audio data.

According to some embodiments of the present disclosure, in the video processing method provided by the present disclosure, the obtaining the at least one recommended material that matches the video content feature comprises:

determining a video style feature based on video images of the original video; and obtaining the at least one recommended material that matches the video style feature and the video content feature.

According to some embodiments of the present disclosure, in the video processing method provided by the present disclosure, the determining the video style feature based on the video images of the original video comprises:

performing an image recognition on the video images of the original video, and determining at least one capture object based on a recognition result; and performing a weighting calculation on the at least one capture object based on preset object weights, and matching a calculation result with preset style classifications to determine the video style feature corresponding to the original video.

According to some embodiments of the present disclosure, in the video processing method provided by the present disclosure, the obtaining the at least one recommended material that matches the video content feature comprises:

determining a playback duration of video frames corresponding to the video content feature in the original video, wherein the video content feature is generated based on a video content of the video frames;

tagging the video content feature with a duration identifier based on the playback duration of the video frames;

in a case where a plurality of video content features are determined to correspond to the duration identifier, combining the plurality of video content features into a video feature set, and obtaining the at least one recommended material that matches the video feature set, wherein the plurality of video content features comprises the video content feature; and in a case where only the video content feature is determined to correspond to the duration identifier, obtaining the at least one recommended material that matches the video content feature.

According to some embodiments of the present disclosure, in the video processing method provided by the present disclosure, the generating the target video by processing the original video according to the at least one recommended material comprises:

setting a material application duration for the at least one recommended material that matches the video content feature according to the duration identifier of the video content feature; and editing the original video to generate the target video according to the material application duration of the at least one recommended material.

According to some embodiments of the present disclosure, in the video processing method provided by the present disclosure, the editing the original video to generate the target video according to the material application duration of the at least one recommended material comprises:

in a case where a material type of the at least one recommended material is a preset target type, obtaining target video frames corresponding to the material application duration of the at least one recommended material from the original video;

performing an image recognition on the target video frames to obtain a main region of a capture object;

determining a material region for adding the at least one recommended material on the target video frames based on the main region of the capture object; and editing the original video to generate the target video according to the material application duration and the material region of the at least one recommended material.

According to some embodiments of the present disclosure, in the video processing method provided by the present disclosure, the detecting the audio identifier of the each of the audio tracks comprises:

identifying a sound feature of an audio corresponding to the each of the audio tracks;

matching the sound feature of the audio corresponding to the each of the audio tracks with a sound feature corresponding to each preset audio identifier; and determining the audio identifier of the each of the audio tracks based on a matching result.

According to some embodiments of the present disclosure, in the video processing method provided by the present disclosure, the obtaining the at least one recommended material that matches the video feature set comprises:

inquiring a preset correspondence to determine whether there is an enhancement material corresponding to the video feature set according to the video feature set;

in case that there is no enhancement material corresponding to the video feature set, splitting the video feature set into individual content features to match the at least one recommended material; and in case that there is an enhancement material corresponding to the video feature set, taking the enhancement material as the at least one recommended material corresponding to the video feature set.

According to some embodiments of the present disclosure, the present disclosure provides a video processing apparatus, comprising:

an extraction module configured to extract a video content feature based on an analysis of an original video;

an obtaining module configured to obtain at least one recommended material that matches the video content feature;

a processing module configured to generate a target video by processing the original video based on the at least one recommended material, wherein the target video is a video generated by adding the at least one recommended material to the original video.

According to some embodiments of the present disclosure, in the video processing apparatus provided by the present disclosure, the extraction module is configured to:

perform a speech recognition on target audio data of the original video to obtain a text content corresponding to the target audio data; and perform a semantic parsing on the text content to obtain a first keyword.

According to some embodiments of the present disclosure, in the video processing apparatus provided by the present disclosure, the extraction module is configured to:

Perform a sound detection on target audio data of the original video to obtain spectral data corresponding to the target audio data; and analyze the spectral data to obtain a second keyword.

According to some embodiments of the present disclosure, in the video processing apparatus provided by the present disclosure, the extraction module is configured to:
obtain all audio tracks displayed in a video editing application for a video file of the original video;
merge all the audio tracks based on a timeline to generate total audio data; and
compare a first duration of the total audio data with a second duration of the original video and cropping the first duration of the total audio data to obtain the target audio data in response to the first duration being greater than the second duration, wherein the duration of the target audio data is consistent with the second duration.

According to one or more embodiments of the present disclosure, in the video processing apparatus provided by the present disclosure, the extraction module is configured to:
detect an audio identifier of each of the audio tracks; and
in response to detecting a target audio track with an identifier representing background music, merge all audio tracks except that target audio track based on the timeline to generate the total audio data.

According to some embodiments of the present disclosure, in the video processing apparatus provided by the present disclosure, the obtaining module is particularly configured to:
determine a video style feature based on video images of the original video; and
obtain the at least one recommended material that matches the video style feature and the video content feature.

According to some embodiments of the present disclosure, in the video processing apparatus provided by the present disclosure, the obtaining module is particularly configured to:
perform an image recognition on the video images of the original video, and determining at least one capture object based on a recognition result; and
perform a weighting calculation on the at least one capture object based on preset object weights, and match a calculation result with preset style classifications to determine the video style feature corresponding to the original video.

According to some embodiments of the present disclosure, in the video processing apparatus provided by the present disclosure, the obtaining module is configured to:
determine a playback duration of video frames corresponding to the video content feature in the original video, wherein the video content feature is generated based on a video content of the video frames;
tag the video content feature with a duration identifier based on the playback duration of the video frames;
in a case where a plurality of video content features are determined to correspond to the duration identifier, combine the plurality of video content features into a video feature set, and obtain the at least one recommended material that matches the video feature set, wherein the plurality of video content features comprises the video content feature; and
in a case where only the video content feature is determined to correspond to the duration identifier, obtain the at least one recommended material that matches the video content feature.

According to some embodiments of the present disclosure, in the video processing apparatus provided by the present disclosure, the obtaining module is configured to:
set a material application duration for the at least one recommended material that matches the video content feature according to the duration identifier of the video content feature; and
edit the original video to generate the target video according to the material application duration of the at least one recommended material.

According to some embodiments of the present disclosure, in the video processing apparatus provided by the present disclosure, the obtaining module is configured to:
in a case where a material type of the at least one recommended material is a preset target type, obtain target video frames corresponding to the material application duration of the at least one recommended material from the original video;
perform an image recognition on the target video frames to obtain a main region of a capture object;
determine a material region for adding the at least one recommended material on the target video frames based on the main region of the capture object; and
edit the original video to generate the target video according to the material application duration and the material region of the at least one recommended material.

According to some embodiments of the present disclosure, in the video processing apparatus provided by the present disclosure, the editing module is configured to:
identify a sound feature of an audio corresponding to the each of the audio tracks;
match the sound feature of the audio corresponding to the each of the audio tracks with a sound feature corresponding to each preset audio identifier; and
determine the audio identifier of the each of the audio tracks based on a matching result.

According to some embodiments of the present disclosure, in the video processing apparatus provided by the present disclosure, the obtaining module is configured to:
inquire a preset correspondence to determine whether there is an enhancement material corresponding to the video feature set according to the video feature set;
in case that there is no enhancement material corresponding to the video feature set, split the video feature set into individual content features to match the at least one recommended material; and
in case that there is an enhancement material corresponding to the video feature set, take the enhancement material as the at least one recommended material corresponding to the video feature set.

According to some embodiments of the present disclosure, the present disclosure provides an electronic device, comprising:
a processor;
a memory for storing processor executable instructions;
wherein the processor is configured to read the executable instructions from the memory and execute the executable instructions to implement any embodiment of the video processing methods provided by the present disclosure.

According to some embodiments of the present disclosure, the present disclosure provides a non-transitory computer-readable storage medium stored thereon a computer program, which when executed by a processor, causes the processor to perform any embodiment of the video processing methods provided in the present disclosure.

The above description is only preferred embodiments of the present disclosure and an explanation of the applied technical principles. Those skilled in the art should understand that the scope of disclosure involved in this disclosure is not limited to the technical solutions formed by the specific combination of the above technical features, and should also cover other technical solutions formed by any combination of the above technical features or their equivalent features without departing from the disclosed concept, for example, technical solutions formed by replacing the above features with technical features having similar functions to (but not limited to) those disclosed in the present disclosure.

In addition, although the operations are depicted in a specific order, this should not be understood as requiring these operations to be performed in the specific order shown or performed in a sequential order. Under certain circumstances, multitasking and parallel processing may be advantageous. Likewise, although several specific implementation details are comprised in the above discussion, these should not be construed as limiting the scope of the present disclosure. Certain features that are described in the context of separate embodiments can also be implemented in combination in a single embodiment. Conversely, various features described in the context of a single embodiment can also be implemented in multiple embodiments individually or in any suitable subcombination.

Although the subject matter has been described in language specific to structural features and/or logical actions of the method, it should be understood that the subject matter defined in the appended claims is not necessarily limited to the specific features or actions described above. On the contrary, the specific features and actions described above are merely exemplary forms of implementing the claims.

What is claimed is:

1. A video processing method, comprising:
   extracting a video content feature based on an analysis of an original video;
   obtaining at least one recommended material that matches the video content feature, comprising:
      determining a playback duration of video frames corresponding to the video content feature in the original video, wherein the video content feature is generated based on a video content of the video frames;
      tagging the video content feature with a duration identifier based on the playback duration of the video frames;
      in a case where a plurality of video content features are determined to correspond to the duration identifier, combining the plurality of video content features into a video feature set, and obtaining the at least one recommended material that matches the video feature set, wherein the plurality of video content features comprises the video content feature; and
      in a case where only the video content feature is determined to correspond to the duration identifier, obtaining the at least one recommended material that matches the video content feature; and
   generating a target video by processing the original video according to the at least one recommended material, wherein the target video is a video generated by adding the at least one recommended material to the original video.

2. The video processing method according to claim 1, wherein the extracting the video content feature based on the analysis of the original video comprises:
   performing a speech recognition on target audio data of the original video to obtain a text content corresponding to the target audio data; and
   performing a semantic parsing on the text content to obtain a first keyword.

3. The video processing method according to claim 1, wherein the extracting the video content feature based on the analysis of the original video comprises:
   performing a sound detection on target audio data of the original video to obtain spectral data corresponding to the target audio data; and
   analyzing the spectral data to obtain a second keyword.

4. The video processing method according to claim 2, wherein the target audio data is obtained by:
   obtaining all audio tracks displayed in a video editing application for a video file of the original video;
   merging all the audio tracks based on a timeline to generate total audio data; and
   comparing a first duration of the total audio data with a second duration of the original video and cropping the first duration of the total audio data to obtain the target audio data in response to the first duration being greater than the second duration, wherein the duration of the target audio data is consistent with the second duration.

5. The video processing method according to claim 4, wherein the merging all the audio tracks based on the timeline to generate the total audio data comprises:
   detecting an audio identifier of each of the audio tracks; and
   in response to detecting a target audio track with an identifier representing background music, merging all audio tracks except that target audio track based on the timeline to generate the total audio data.

6. The video processing method according to claim 1, wherein the obtaining the at least one recommended material that matches the video content feature comprises:
   determining a video style feature based on video images of the original video; and
   obtaining the at least one recommended material that matches the video style feature and the video content feature.

7. The video processing method according to claim 6, wherein the determining the video style feature based on the video images of the original video comprises:
   performing an image recognition on the video images of the original video, and determining at least one capture object based on a recognition result; and
   performing a weighting calculation on the at least one capture object based on preset object weights, and matching a calculation result with preset style classifications to determine the video style feature corresponding to the original video.

8. The video processing method according to claim 1, wherein the generating the target video by processing the original video according to the at least one recommended material comprises:
   setting a material application duration for the at least one recommended material that matches the video content feature according to the duration identifier of the video content feature; and
   editing the original video to generate the target video according to the material application duration of the at least one recommended material.

9. The video processing method according to claim 8, wherein the editing the original video to generate the target video according to the material application duration of the at least one recommended material comprises:
   in a case where a material type of the at least one recommended material is a preset target type, obtaining target video frames corresponding to the material application duration of the at least one recommended material from the original video;

performing an image recognition on the target video frames to obtain a main region of a capture object;

determining a material region for adding the at least one recommended material on the target video frames based on the main region of the capture object; and editing the original video to generate the target video according to the material application duration and the material region of the at least one recommended material.

10. The video processing method according to claim 5, wherein the detecting the audio identifier of the each of the audio tracks comprises:

identifying a sound feature of an audio corresponding to the each of the audio tracks;

matching the sound feature of the audio corresponding to the each of the audio tracks with a sound feature corresponding to each preset audio identifier; and determining the audio identifier of the each of the audio tracks based on a matching result.

11. The video processing method according to claim 1, wherein the obtaining the at least one recommended material that matches the video feature set comprises:

inquiring a preset correspondence to determine whether there is an enhancement material corresponding to the video feature set according to the video feature set;

in case that there is no enhancement material corresponding to the video feature set, splitting the video feature set into individual content features to match the at least one recommended material; and in case that there is an enhancement material corresponding to the video feature set, taking the enhancement material as the at least one recommended material corresponding to the video feature set.

12. An electronic device, comprising:

a processor;

a memory for storing executable instructions by the processor, wherein the processor is configured to read the executable instructions from the memory and execute the executable instructions to:

extract a video content feature based on an analysis of an original video;

obtain at least one recommended material that matches the video content feature, comprising:

determining a playback duration of video frames corresponding to the video content feature in the original video, wherein the video content feature is generated based on a video content of the video frames;

tagging the video content feature with a duration identifier based on the playback duration of the video frames;

in a case where a plurality of video content features are determined to correspond to the duration identifier, combining the plurality of video content features into a video feature set, and obtaining the at least one recommended material that matches the video feature set, wherein the plurality of video content features comprises the video content feature; and in a case where only the video content feature is determined to correspond to the duration identifier, obtaining the at least one recommended material that matches the video content feature; and generate a target video by processing the original video according to the at least one recommended material, wherein the target video is a video generated by adding the recommended material to the original video.

13. The electronic device according to claim 12, wherein the extracting the video content feature based on the analysis of the original video comprises:

performing a speech recognition on target audio data of the original video to obtain a text content corresponding to the target audio data; and performing a semantic parsing on the text content to obtain a first keyword.

14. The electronic device according to claim 12, wherein the extracting the video content feature based on the analysis of the original video comprises:

performing a sound detection on target audio data of the original video to obtain spectral data corresponding to the target audio data; and analyzing the spectral data to obtain a second keyword.

15. The electronic device according to claim 13, wherein the target audio data is obtained by:

obtaining all audio tracks displayed in a video editing application for a video file of the original video;

merging all the audio tracks based on a timeline to generate total audio data; and comparing a first duration of the total audio data with a second duration of the original video and cropping the first duration of the total audio data to obtain the target audio data in response to the first duration being greater than the second duration, wherein the duration of the target audio data is consistent with the second duration.

16. The electronic device according to claim 15, wherein the merging all the audio tracks based on the timeline to generate the total audio data comprises:

detecting an audio identifier of each of the audio tracks; and in response to detecting a target audio track with an identifier representing background music, merging all audio tracks except that target audio track based on the timeline to generate the total audio data.

17. The electronic device according to claim 12, wherein the obtaining the at least one recommended material that matches the video content feature comprises:

determining a video style feature based on video images of the original video; and obtaining at least one recommended material that matches the video style feature and the video content feature.

18. The electronic device according to claim 17, wherein the determining the video style feature based on the video images of the original video comprises:

performing an image recognition on the video images of the original video, and determining at least one capture object based on a recognition result; and performing a weighting calculation on the at least one capture object based on preset object weights, and matching a calculation result with preset style classifications to determine the video style feature corresponding to the original video.

19. A non-transitory computer-readable storage medium stored thereon a computer program, which when executed by a processor, causes the processor to:

extract a video content feature based on an analysis of an original video;

obtain at least one recommended material that matches the video content feature, comprising:

determining a playback duration of video frames corresponding to the video content feature in the original video, wherein the video content feature is generated based on a video content of the video frames;

tagging the video content feature with a duration identifier based on the playback duration of the video frames;

in a case where a plurality of video content features are determined to correspond to the duration identifier, combining the plurality of video content features into a video feature set, and obtaining the at least one recommended material that matches the video feature set, wherein the plurality of video content features comprises the video content feature; and in a case where only the video content feature is determined to correspond to the duration identifier, obtaining the at least one recommended material that matches the video content feature; and generate a target video by processing the original video according to the at least one recommended material, wherein the target video is a video generated by adding the recommended material to the original video.

20. The non-transitory computer-readable storage medium according to claim 19, wherein the extracting the video content feature based on the analysis of the original video comprises:

performing a speech recognition on target audio data of the original video to obtain a text content corresponding to the target audio data; and performing a semantic parsing on the text content to obtain a first keyword.

\* \* \* \* \*